US010318012B2

(12) United States Patent
Tangen et al.

(10) Patent No.: US 10,318,012 B2
(45) Date of Patent: Jun. 11, 2019

(54) FLIP COVER WIRELESS KEYBOARD WHICH UTILIZES WIRELESS PROTOCOLS FOR HARVESTING POWER AND COMMUNICATING WITH DIGITAL APPARATUS

(71) Applicant: one2touch AS, Oslo (NO)

(72) Inventors: Kyrre Tangen, Fredrikstad (NO); Nils Bjoerdal, Fredrikstad (NO); Victor Rosenvinge, Fredrikstad (NO)

(73) Assignee: ONE2TOUCH AS, Oslo (NO)

( * ) Notice: Subject to any disclaimer, the term of this patent is extended or adjusted under 35 U.S.C. 154(b) by 0 days.

(21) Appl. No.: 15/502,366

(22) PCT Filed: Aug. 7, 2015

(86) PCT No.: PCT/NO2015/050132
§ 371 (c)(1),
(2) Date: Feb. 7, 2017

(87) PCT Pub. No.: WO2016/022030
PCT Pub. Date: Feb. 11, 2016

(65) Prior Publication Data
US 2017/0228038 A1   Aug. 10, 2017

(30) Foreign Application Priority Data

Aug. 8, 2014 (GB) .................................. 1414087.5
Aug. 8, 2014 (NO) .................................. 20140974

(51) Int. Cl.
*H02J 50/10* (2016.01)
*G06F 3/02* (2006.01)
(Continued)

(52) U.S. Cl.
CPC .............. *G06F 3/02* (2013.01); *G06F 1/1626* (2013.01); *G06F 1/1643* (2013.01);
(Continued)

(58) Field of Classification Search
USPC ...................................................... 710/8–17
See application file for complete search history.

(56) References Cited

U.S. PATENT DOCUMENTS 6,133,833 A   10/2000 Sidlauskas et al.
8,897,836 B2 * 11/2014 Kreiner ................. G06F 1/1632
                                                                 455/41.2
(Continued)

FOREIGN PATENT DOCUMENTS

EP   2323010 A2   5/2011
EP   2664974 A1   11/2013

OTHER PUBLICATIONS

International Search Report PCT/NO2015/050132 dated Oct. 27, 2015.
(Continued)

*Primary Examiner* — Raymond N Phan
(74) *Attorney, Agent, or Firm* — McDermott Will & Emery LLP

(57) ABSTRACT

A keyboard arrangement and a method for a digital apparatus, wherein the keyboard arrangement comprising keyboard means for receiving user input data, processing data and for interfacing the digital apparatus, mechanical means for attaching to several types of digital apparatus, protection means for covering and safeguarding the digital apparatus, wherein the said keyboard means utilizing a NFC protocol for setting up a connection with the digital apparatus, for harvesting power from the digital apparatus and for transmitting data to the digital apparatus in response to user-actuation, and said keyboard means receiving a request message powering and turning on the keyboard means, thereafter the keyboard means determining if at least one engage key being pressed at user input means, then the keyboard means receiving data from user input means and processing and transmitting said data to the digital apparatus.

25 Claims, 11 Drawing Sheets

(51) Int. Cl.
  *G06F 9/4401* (2018.01)
  *G06F 1/3203* (2019.01)
  *G06F 1/16* (2006.01)
  *H04B 5/00* (2006.01)
  *H04W 4/80* (2018.01)
  *H02J 7/02* (2016.01)

(52) U.S. Cl.
  CPC .......... *G06F 1/1669* (2013.01); *G06F 1/3203* (2013.01); *G06F 9/4411* (2013.01); *H02J 7/025* (2013.01); *H02J 50/10* (2016.02); *H04B 5/0031* (2013.01); *H04B 5/0037* (2013.01); *H04W 4/80* (2018.02); *G06F 1/16* (2013.01); *G06F 2200/1634* (2013.01)

(56) References Cited

U.S. PATENT DOCUMENTS

| | | |
|---|---|---|
| 8,964,364 B2 * | 2/2015 | Abdelsamie .......... G06F 1/1628 361/679.03 |
| 2009/0033627 A1 | 2/2009 | Aasen |
| 2013/0149964 A1 | 6/2013 | Kreiner |
| 2013/0183899 A1 | 7/2013 | Gorsev |
| 2014/0146464 A1 | 5/2014 | Abdelsamie et al. |

OTHER PUBLICATIONS

E. Strommer et al., "NEC-enabled Wireless Charging", 2014 4th International Workshop on Near Field communication, IEEE, Mar. 13, 2012, pp. 36-41.
European Search Report issued in corresponding European Patent Application No. 15830193.7-1220, dated Mar. 12, 2018.

* cited by examiner

Figure 2 – Smartphone

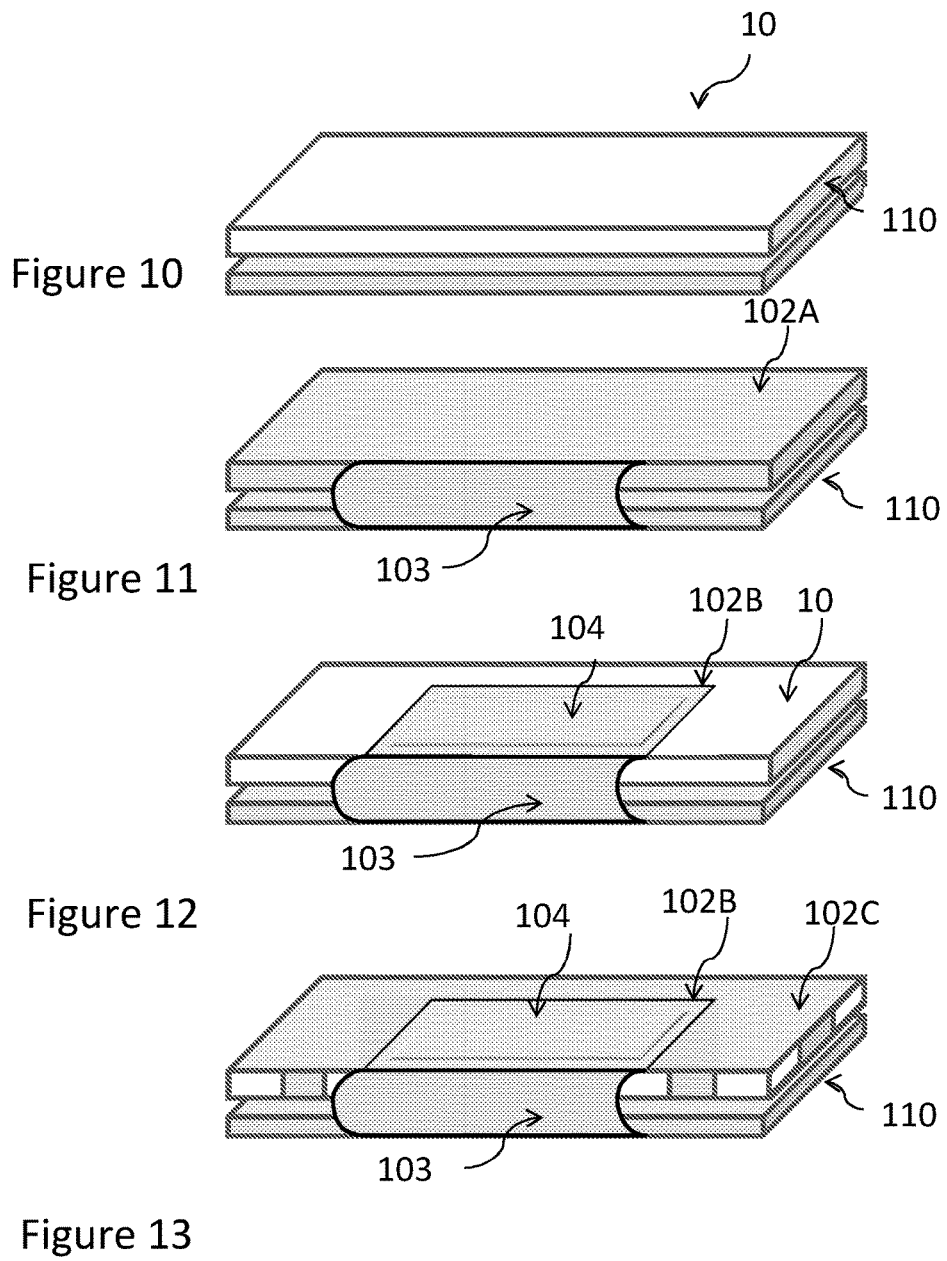

ial apparatus, and versatile mechanical design for being attachable to several different types of digital apparatus.

FLIP COVER WIRELESS KEYBOARD WHICH UTILIZES WIRELESS PROTOCOLS FOR HARVESTING POWER AND COMMUNICATING WITH DIGITAL APPARATUS

CROSS-REFERENCE TO RELATED APPLICATIONS

This application is the U.S. National Phase of PCT/NO2015/050132 filed Aug. 7, 2015, which claims priority to Norweigian Patent Application No. 20140974 filed Aug. 8, 2014, and United Kingdom Patent Application No. 1414087.5 filed Aug. 8, 2014. The subject matter of each is incorporated herein by reference, in entirety.

FIELD OF THE INVENTION

The present invention relates to external keyboards, for example to external keyboards interoperable with digital apparatus spatially positioned in near proximity thereto. More specifically, the present invention is optimized for integrating said keyboards to digital apparatus both electronically and mechanically in a seamless way. Even more specifically, the present invention relates to flip cover wireless keyboards utilizing wireless protocols, for both harvesting power and for communicating with a plurality of different types of digital apparatus, and versatile mechanical design for being attachable to several different types of digital apparatus.

BACKGROUND OF THE INVENTION

In the market today, there are offered many different types of digital apparatus, such as for example cell phones, mobile telephones, digital personal organizers, personal data assistants (PDAs) and smartphones. Usually, these digital apparatus has either a mechanical keyboard and a display screen or a touch screen display incorporating a touch keyboard. An example of a digital apparatus, more specific a smartphone, is illustrated in FIG. 1, wherein the smartphone is generally indicated by 10. The smartphone 10 includes a display screen 20, for example implemented using liquid crystal display (LCD) or Light Emitting Diode (LED) technology, for displaying information such as text and images to a user of the smartphone 10. Moreover, the smartphone display screen 20 further displays a touch keyboard 30 for inputting data into the smartphone 10, for example numerical data for dialing and text for writing special messaging service (SMS), emails and documents in text editor application programs. Furthermore, as shown in FIG. 2 other component parts of the smartphone include a microphone 40 and a loudspeaker 50 coupled to a data processor 60. Moreover, the smartphone 10 also includes an antenna 70 coupled to radio frequency circuits 80 coupled in turn to the data processor 60 of the smartphone 10 for enabling said smartphone 10 to communicate by wireless to a mobile telephone network (not shown); such communication to the mobile telephone network is implemented at a radio communication frequency in an order of 1 GHz. Optionally, the smartphone 10 is also capable of communicating directly, via a wireless interface 90 coupled to the data processor 60, with other devices in close spatial proximity to the telephone 10, by WiFi, Bluetooth, Radio Frequency Identification Devices (RFID), Near field communication (NFC) or similar protocols. Such other devices include, for example, an earphone, a headset microphone, a keyboard or a computer pointing device.

Digital apparatus, such as smartphones, are becoming progressively more complex with time as manufacturers include more powerful data processors and more memory therein. Moreover, such apparatus has for some time now attained a sufficient degree of sophistication that software applications can be downloaded thereto for performing special functions which can be optionally executed in response to users' commands. For example, some smartphones now include text editor application software to assist with in writing documents, emails, blogs and social media content.

In order to provide digital apparatus, such as smartphone products, which are desirable to contemporary users, manufacturers of such products have sought to produce progressively more compact digital apparatus. A consequence of such miniaturization is that the aforementioned touch screen keyboard 30 has evolved by one or more of: including more user accessible keys, employing keys of smaller physical size, employing multifunction keys. Moreover, a further consequence of such miniaturization is that the aforementioned display screen 20 is of increased pixel resolution for presenting finer detail. Such evolution of the keyboard 30 and the display 20 results in problems for users with diminished eyesight and lack of finger nimbleness experiencing difficulty when working with contemporary digital apparatus such as smartphones. In order to address such problems, it is contemporary practice to provide users with a pointed stylus for pressing miniature keys and also with optical magnifies, for example magnifying lenses for observing miniature displays. Moreover, multifunction keys are susceptible to reducing a total number of keys require but renders user data entry laborious unless users have superlative finger nimbleness. A solution to these problems that exist today is to have separate wireless external keyboards as discussed below.

As mentioned, digital apparatus is able to communicate with devices in the near proximity using NFC or similar wireless protocols. The NFC technology is based on a combination of contactless identification technology akin to RFID and various connection technologies. Standards have become established which define how devices employing such technologies can inter-operate to form peer-to-peer (P2P) networks. NFC operates in a frequency range in an order of 13.56 MHz over a distance of typically a few centimeters. Moreover, efforts have been hitherto applied to standardize NFC-technology; such standards include ISO 18092, ISO 21481, ECMA (340, 352 and 356) and ETSI TS 102 190. Furthermore, such NFC-technology is also compatible with contactless infrastructure for smartcards based on a standard ISO 14443 A, including Philips' MIFARE-technology and Sony's FeliCa-card.

Typically e.g. a mobile phone may set up an intermittent continuous NFC field in a state that we may call sniffer mode. In sniffer mode, the average current needed for this from the mobile phone is rather small, typically in the area of one mA. The sniffer mode is typically a repetitive short duration pulse train that is repeated at intervals of a few hundred milliseconds. The pulses typically are too short for an accessory NFC device to harvest significant energy therefrom. An electromagnetic field then surrounds the mobile phone. When an accessory NFC device approaches the mobile phone acting as an active NFC device, the active NFC device detects that the impedance of its antenna changes and will start a procedure to investigate and connect the active and the accessory NFC devices. When the active NFC device detects such a change of impedance, the active NFC device will transmit longer pulses with sufficient energy for the accessory NFC device to start. The pulses also comprise an initialization sequence. Accordingly, an accessory NFC device will initiate communication with the active NFC device.

When the two NFC devices are connected, data exchange mode is enabled. In data exchange mode, a short chunk of information is transferred one or both ways, the exchange mode is terminated, and sniffer mode is reinstated.

One example in the art that present harvesting of power from a second NFC device to a first NFC device is the Patent publication US 20140170976 A1 of Broadcom Corporation. This application uses the existing NFC technology as specified in the current standards.

Other remote wireless keyboards are known. For example, in a published U.S. Pat. No. 6,133,833, there is described a wireless keyboard or keypad which is powered remotely by a radio frequency exciter/receiver. The wireless keyboard is adapted for use in a radio frequency identification system. Moreover, the wireless keyboard and the exciter/receiver communicate without wires via electrostatic or electromagnetic radiation. No power source is integrated with the wireless keypad. It is alleged that the wireless keypad is readily added to, or retrofitted into, an existing radio frequency identification system. The keyboard has a plurality of keys or control members that are manually actuated. Depression of a key or button causes a predetermined response signal associated with that key or button to be generated. The response signal relates to an operation for a device or system associated with the exciter/receiver. Implementation of the wireless keyboard involves coupling an antenna comprising an inductor and a capacitor directly to an array of RFID devices which are selectively connected to the antenna in response to keys or buttons being user-actuated.

A wireless keyboard as described in the foregoing is of relatively larger physical size in comparison to a smartphone. The keyboard is bulky, not a mobile solution and is not mechanical designed to fit together with different types of digital apparatus. Moreover, such a keyboard is often implemented such that a smartphone could not be capable of coupling sufficiently well to provide power to the keyboard.

The PCT application WO 2007/089158 A1 with the title "External Keyboard" presents a keyboard including user-operable alpha-numeric keys. One or more identification devices associated with the user-operable keys are included in the keyboard. When placed in proximity to the keyboard, the one or more identification devices selectively communicate with a digital apparatus in response to user-actuation of the user-operable keys. The keyboard comprises a flexible substrate for enabling the keyboard to be folded into a non-deployed inactive state, and unfolded into a deployed active state for communicating with the digital apparatus. When the keyboard is in near proximity to the digital apparatus, the keyboard communicates with the digital apparatus by way of near-field magnetic and/or electrostatic coupling. The keyboard includes an intermediate resonant circuit for interfacing between the one or more identification devices and the digital apparatus; the resonant circuit includes a component spatially disposed to overlay a first region onto the digital apparatus in use, and to overlay a second region coupled to the one or more identification devices in use for coupling signals there between. The keyboard is especially useful for digital apparatus for rendering data entry easier.

The external keyboard as described in the foregoing is not optimized for integrating the keyboard to all kinds of digital apparatus in a seamless way. In this solution, the external keyboard and the digital apparatus are operating as two separate units. Consequently, the external keyboard does not share common functionality with the digital apparatus, wherein the two units can interoperate for enhancing the usability. Moreover, the mentioned keyboard is missing a versatile cover solution that implements mechanical design with the user interface functionality and at the same time protects the digital apparatus.

SUMMARY OF THE INVENTION

A first object of the invention is to provide a flip cover wireless keyboard which is a combined wireless keyboard and flip cover protecting the screen of the digital apparatus.

A second object of the invention is to provide a flip cover wireless keyboard capable of interoperating with a plurality of different types of smartphones and similar types of miniature digital apparatus.

A third object is to provide a flip cover wireless keyboard solution that utilizes a wireless protocol for setting up a connection with a digital apparatus, to harvest power from said digital apparatus and to transmit data to said digital apparatus in response to user-actuation.

A fourth object is to provide a flip cover wireless keyboard without need for manually pairing of flip cover wireless keyboard and digital apparatus.

An even further object is to provide a slim, miniaturized and compact flip cover wireless keyboard powered by wireless transmission and without battery, power wirings circuitry and power wire charging.

An even further object is to provide a flip cover wireless keyboard that compromises a mechanical keyboard, a touch screen keyboard or other user input means.

An even further object is to provide a flip cover wireless keyboard that is integrated with the functionality of the digital apparatus for enabling detection of the position of the flip cover wireless keyboard in relation to the digital apparatus.

An even further object is to provide a flip cover wireless keyboard that is turning on or off when a widget, a dedicated key or a combination of keys are being pressed down at the flip cover wireless keyboard simultaneously with receiving a request message from the digital apparatus.

An even further object is to provide a flip cover wireless keyboard that removes the touch keyboard from the touch screen of the digital apparatus allowing the complete screen of the digital apparatus to be utilized for viewing data.

An even further object is to provide a flip cover wireless keyboard that includes a touch screen keyboard comprising various user interfaces adaptable to different alphabets, keyboard types or keyboard types or alpha-numeric keys.

An even further object is to provide a flip cover wireless keyboard that comprises a screen with user interfaces applicable for managing multimedia software applications.

An even further object is to provide a digital apparatus with a flip cover wireless keyboard that might be used as an e-book reader.

An even further object is to provide a flip cover wireless keyboard that is mechanical attachable to several different types of digital apparatus.

An even further object is to provide a flip cover wireless keyboard that can be integrated mechanically with the digital apparatus and when in closed modus or open modus protects the backside of the digital apparatus.

An even further object is to provide a flip cover wireless keyboard that can be integrated mechanically with the digital apparatus and when in closed modus protects both the digital apparatus screen and the keyboard part of the flip cover.

An even further object of the invention is to provide a flip cover wireless keyboard solution that is compact when stored, but operable to assume a sufficiently large size when deployed to facilitate efficient user communication.

A further object of the invention is to provide a flip cover wireless keyboard solution with means for allowing the keyboard being detected by the digital apparatus without changing the distance between the two.

A further object of the invention is to provide a flip cover wireless keyboard solution with means for allowing the keyboard providing for reception of sufficient energy from the digital apparatus to power up the keyboard.

A still further object of the invention is to provide a flip cover wireless keyboard solution allowing a user to initiate detection of the keyboard by the digital apparatus.

A still further object of the invention is to provide a flip cover wireless keyboard solution adapted to avoiding confusion with other NFC devices.

One or more of these objects of the invention are capable of being addressed by the present invention as defined by the accompanying claims.

According to a first aspect of the invention, there is provided a keyboard and a method for a digital apparatus wherein the keyboard comprising keyboard means for receiving user input data, processing data and for interfacing said digital apparatus, mechanical means for attaching to said digital apparatus, protection means for covering and safeguarding said digital apparatus, characterized in that said keyboard means utilizing a NFC protocol for setting up a connection with the digital apparatus, for harvesting power from the digital apparatus and for transmitting data to the digital apparatus in response to user-actuation, and said keyboard means receiving a request message powering and turning on the keyboard means, the keyboard means determining if at least one engage key being pressed at user input means, the keyboard means receiving data from user input means and processing and transmitting said data to the digital apparatus.

According to a second aspect of the invention, there is provided a digital system including a digital apparatus with a touch screen for viewing data and for receiving user input data and a flip cover wireless keyboard with protection means for covering and safeguarding the digital apparatus, keyboard means 110 for processing data and interfacing the digital apparatus and user input means for receiving user input data,
characterized in that said keyboard being integrated with the functionality of the digital apparatus, the functionality utilizing at least one sensor for enabling detection of the position of the keyboard in relation to the digital apparatus, and determining if the keyboard is covering the screen of the digital apparatus said screen being turned off, determining if the keyboard being flipped behind the digital apparatus said keyboard being turned off, or the functionality detecting that a phone application being activated at the digital apparatus said keyboard being turned off.

It will be appreciated that features of the invention are susceptible to being combined in any combination without departing from the scope of the invention as defined by the appended claims.

DESCRIPTION OF THE DIAGRAMS

Embodiments of the invention will now be described, by way of example only, with reference to the following diagrams wherein:

FIG. 10 is a schematic illustration of the flip cover wireless keyboard in near proximity to a digital apparatus.

FIG. 11 is a schematic illustration of the flip cover wireless keyboard comprising a replaceable back cover that encapsulates a digital apparatus.

FIG. 12 is a schematic illustration of the flip cover wireless keyboard comprising a flip that sticks to a digital apparatus.

FIG. 13 is a schematic illustration of the flip cover wireless keyboard comprising an external back cover that encapsulates a digital apparatus.

In the accompanying diagrams, a number accompanied by an associated arrow is used to generally indicate a given item. Moreover, an underlined number is employed to denote an item onto which it is overlaid. A number associated with a connecting line is used to denote an item at which an end of the connecting line remote from the number terminates.

DESCRIPTION OF EMBODIMENTS OF THE INVENTION

In overview, the present invention is concerned with a keyboard arrangement that can interface and communicate with miniaturized digital apparatus by way of near-field wireless communication. The keyboard arrangement can also be attached to a digital apparatus for covering and safeguarding the digital apparatus, wherein a digital apparatus may be all types of mobile telephones, personal data assistants (PDAs), pads, smartphones and such alike, although optionally not limited thereto.

The keyboard arrangement, hereafter referred to as a flip cover wireless keyboard (FCWK), includes keyboard means, for harvesting power and for communicating with a digital apparatus, mechanical means for attaching the FCWK to the digital apparatus, protection means for covering and safeguarding the digital apparatus, and means for cooperating with said digital apparatus.

FCWK Modes

Figure 3:
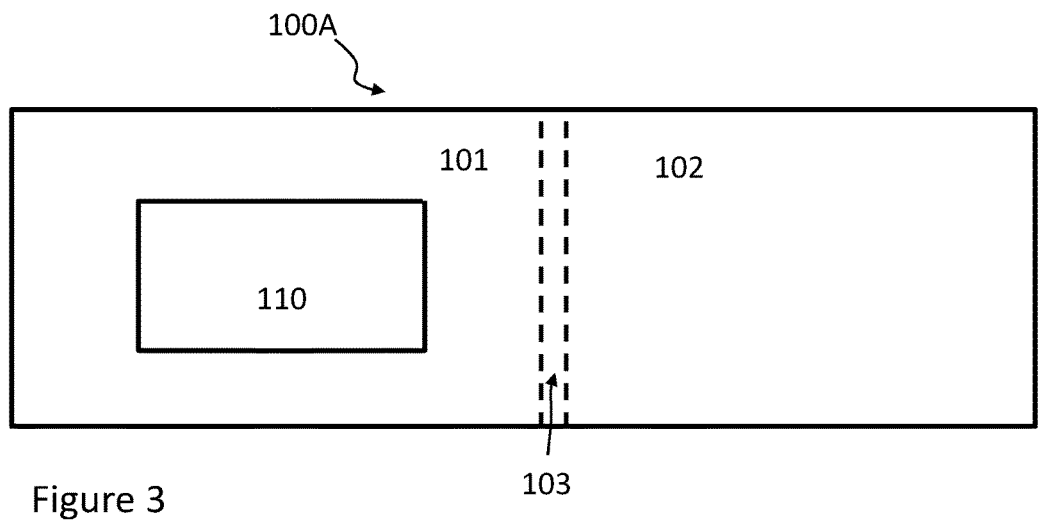
FIG. 3 is an illustration of internal component parts comprising the flip cover wireless keyboard.
Figure 4:
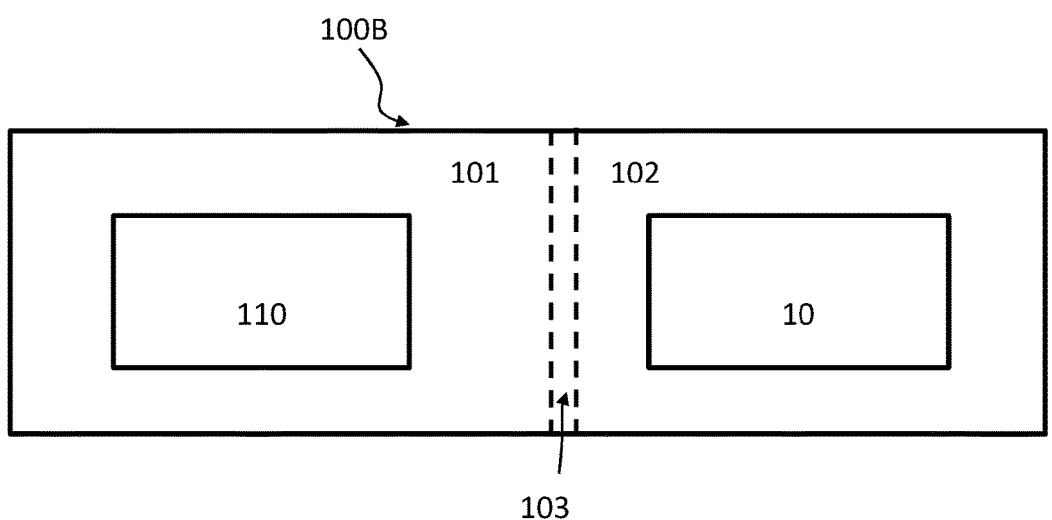
FIG. 4 is an illustration of internal component parts comprising the flip cover wireless keyboard enclosing a digital apparatus.

The FCWK has two modes, a first mode where the FCWK is not physical attached to a digital apparatus and a second mode where the FCWK is attached to a digital apparatus. FIGS. 3 and 4 shows these two modes respectively and also illustrates the internal component parts comprising the FCWK. The FCWK are hereafter indicated generally by 100 when referring to both modes, and more specific 100A for the unattached mode and 100B for the attached mode as shown in the FIGS. 3 and 4.

FCWK Physical Construction of Substrates

The FCWK 100 is fabricated to include two flexible substrates and one bendable substrate, wherein an edge of the bendable substrate is fixed to an edge of a first flexible substrate and another opposite edge of the bendable substrate is fixed to an edge of a second flexible substrate. The first flexible substrate, hereafter referred to as keyboard substrate 101, is further mechanical fastened to a keyboard means 110, wherein the keyboard means 110 being either permanently fixed, as part of the physical construction, or temporary attached to the keyboard substrate 101. In the latter arrangement, the keyboard means 110 is replaceable. Furthermore, the second flexible substrate, hereafter referred to as the digital apparatus substrate 102, can be mechanical attached or unattached to a digital apparatus 10 by a user. Overall, the two flexible substrates are joined together by a bendable substrate 103 enabling a user to fold the first substrate part 101 over the second substrate part 102, or vice versa, into a closed position or flipping the two substrates in a radial half-circle from each other into an open position.

The FCWK 100 illustrated in FIGS. 3 and 4 typically is adapted to the dimensions of the digital apparatus. Optionally, the FCWK has a thickness to its substrates in a range of 1 mm to 2 mm, and optionally planar dimensions when deployed comprising a left-to-right length in a range of 4 cm to 10 cm and a front-to-back depth in a range of 3 cm to 6 cm for both the flexible substrates. The bendable substrate 103 may have 1-2 cm smaller left-to-right length then the flexible substrates and a depth of 5 mm to 10 mm. However, the FCWK can be implemented to have other physical sizes as will be elucidated later.

The flexible substrates 101 and 102 and the bendable substrate part 103, connecting the keyboard substrate 101 to the digital apparatus substrate 102, are preferably fabricated from bendable materials, for example from one or more of: silicone rubber, plastics material film, plastics material film with metallic conductors included thereon or therein, plastics material film with electronic components printed and/or bonded thereonto and so forth. Optionally, the plastics material film is fabricated from polyimide Kapton, acetate sheet or similar.

The substrates 101-103 can be formed by molding, bonding and/or laminating techniques; for example, various sheets of plastics material and/or silicone can be laminated, bonded and/or molded together on a continuous basis and then subsequently cut to form for example a substrate for an individual keyboard means 110 and an individual back covers for digital apparatus 10, such as a smartphone. Such a continuous approach to manufacture in so-called "roll-good" form is capable of rendering the FCKW rapidly mass-producible in automated manufacturing equipment.

FCWK Physical Operation

Furthermore, as mentioned the bendable substrate part 103 allows the keyboard substrate 101 to be folded over the digital apparatus substrate 102 into a closed position. As such, if a digital apparatus 10 is attached to the FCKW 100B the keyboard means 110 is able to cover and to protect the touch screen of the digital apparatus 10. If the keyboard means 110 also comprises a touch screen, both touch screens are facing each other and as such both screens are protected. This is visualized in FIG. 9.

In closed position, the attached FCWK 100B, which includes a keyboard means 110 and a digital apparatus unit 10, is compact and may be easily stored into for example a pocket. When flipped open to an open position the attached FCWK 100B assumes a sufficiently large size and facilitate efficient user communication.

FCWK Electronics

Figure 5:
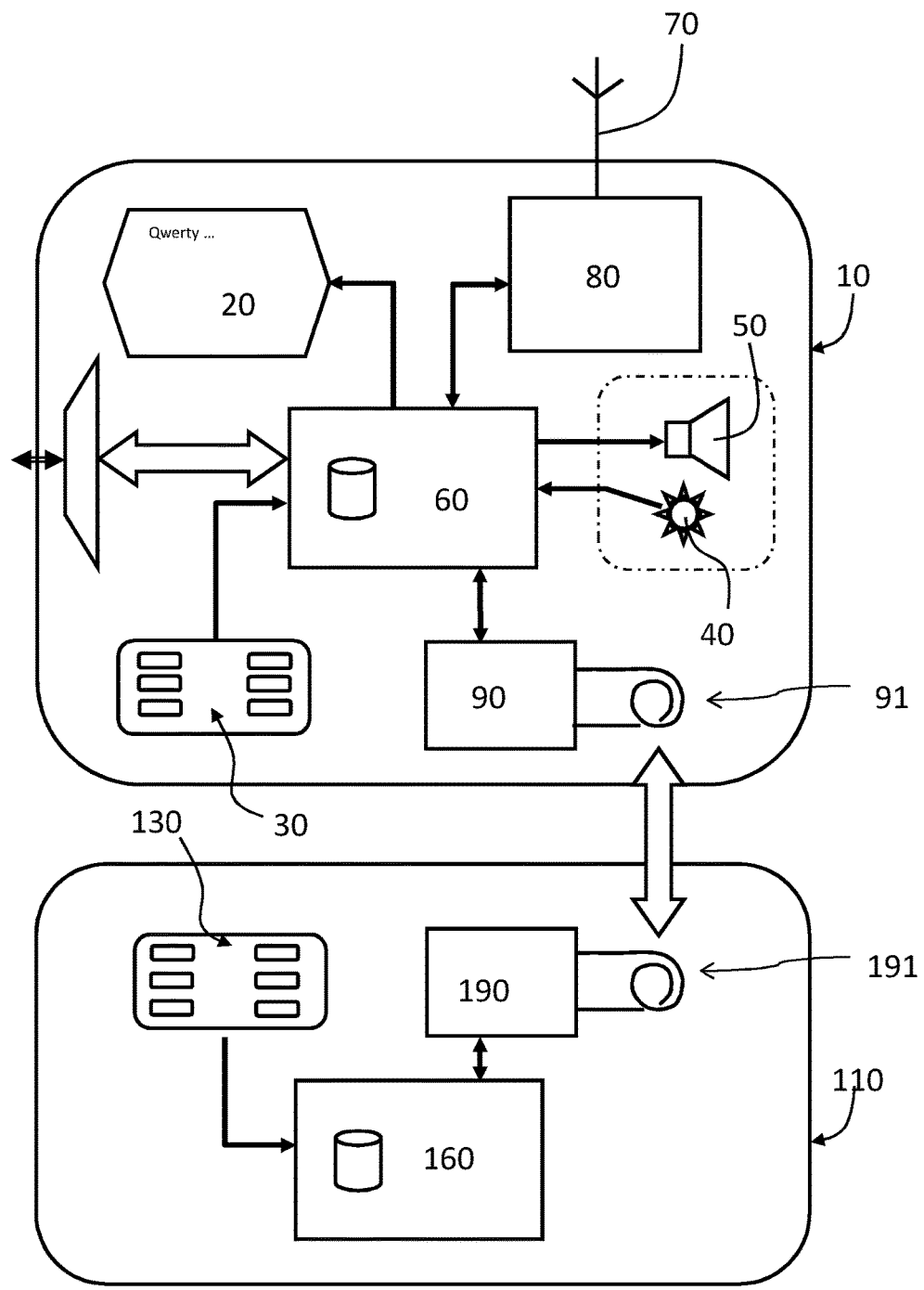
FIG. 5 is a schematic illustration of component parts comprising a wireless keyboard and a smartphone.

The construction of the FCWK 100 will now be further elucidated with reference to FIG. 5. FIG. 5 shows an illustration of the internal component parts comprising a keyboard means 110 and a digital apparatus 10. The keyboard means 110 is utilized for interfacing, communicating and harvesting power from the digital apparatus and for receiving user input data and processing said data. More specifically, the keyboard means 110 includes an user input means 130, for example a mechanical keyboard or a touch-screen keyboard display wherein one or more users may enter data information by pressing buttons or keys, a data process 160 for processing said data entered by one or more users, and a wireless interface 190 enabling the keyboard means 110 to interface, communicate with and to harvest power from at least one digital apparatus 10 utilizing WiFi, Bluetooth, Radio Frequency Identification Devices (RFID), Near field communication (NFC) or other similar protocols.

In an embodiment, the wireless interface 190 may consist of at least one communication circuit such as a NFC circuit, but in another embodiment it may also consist of a plurality of circuits of either the same type or a combination of different types of circuits, for example Bluetooth and NFC.

Furthermore, each communication circuit in the wireless interface 190 includes also at least one wireless antenna 191 that may transmit and/or receive signal from at least one wireless antenna 91 in at least one digital apparatus 10.

The wireless interface 190 comprises also a rectification circuit for awakening and powering the keyboard means 110. Electromagnetic signals transmitted from a digital apparatus 10 may be received by at least one resonant circuit in the wireless interface 190. Moreover, the resonant circuit can include an inductor that produces electrical current if the inductor is receiving electromagnetic signals at the designed resonance frequencies.

In an embodiment, the keyboard means 110 comprises an engage key for establishing connection between the wireless antenna 191 and the data processor 160 via a rectification circuit. The engage key is further arranged for activating change of an impedance of the wireless antenna 191. Impedance of the antenna 191 is here to be understood as the impedance of the antenna 191 including connected circuits and components. In one embodiment the engage key is arranged for establishing connection between the wireless antenna 191 and an impedance modification network 193. The impedance modification network 193 may comprise capacitor, resistor or inductor arranged to be connected between the wireless antenna 191 and a point at a different potential which could be earth by the engage key.

By such a manner of operation, the keyboard means 110 is capable of being operated with power provided solely from an digital apparatus 10 such a smartphone, thereby the keyboard means 110 is susceptible to being implemented to be devoid of any source of power therein, for example devoid of any form of battery or similar therein. Such an implementation is attractive for users of the keyboard means 110, since there is not a need for users to be concerned with malfunction of the keyboard means 110 due to battery expiration occurring therein.

FCWK Wireless Operation

In a preferred embodiment, the wireless interface 190 uses NFC for data communication and power harvesting. NFC is an induction system that transfers power wirelessly and is utilized by digital apparatus, such a smartphone, to awakening and powering nearby NFC devices. By utilizing NFC, the keyboard means 110 may be powered by wireless transmission and as a result there is not a need for battery, power wirings circuitry and power wire charging. As such, the keyboard means 110 comprises fewer components and consequently the FCWK 100, i.e. the keyboard means 110, may be miniaturized to the same size or less than the miniaturized digital apparatus. In addition, the keyboard means 110 may be designed to be very slim, in the order of 1-2 mm. Hence, the keyboard means 110 could be only a touchscreen overlaying a thin printed circuit board without large outward going components.

Another advantage with NFC is that there is not a need for manually pairing the keyboard means 110 and the digital apparatus 10. The NFC protocol allows the keyboard means 110 and the digital apparatus 10 to be instantly paired, and as such, to quickly set up data communication.

In another embodiment, the wireless interface 190 could use Bluetooth for data communication. However, in this arrangement keyboard means 110 is equipped with battery, power wirings circuitry and power wire charging. In addition, the keyboard means 110 and the digital apparatus 10 must be paired before they can communicate by exchanging data information.

In the preferred embodiment, when NFC is activated in a digital apparatus 10, the digital apparatus 10 transmits typically a repetitive short duration pulse train that is repeated at intervals of a few hundred milliseconds to search for other NFC devices. The pulses have a pulse width of a few microseconds and a period of 0.3-0.5 seconds. Accordingly, the pulses are too short for an NFC device to harvest significant energy, and the keyboard means 110 to harvest sufficient energy for powering up the data processor 160. the active NFC device detects that the impedance of its antenna changes and will start a procedure to investigate and connect the active and the accessory NFC devices.

When the digital apparatus 10 detects a change of impedance of its antenna, the digital apparatus 10 will transmit longer pulses with sufficient energy for the keyboard device 110 to start. The pulses also comprise an initialization sequence. These longer pulses are preferably the signal "request for new devices" as defined by the NFC standard ISO/IEC 18000. This request signal or request message is received by the wireless interface 190 in the keyboard means 110 and is used to awaken and power up a data processor 160, such as a Micro Controller Unit (MCU).

When the flip cover wireless keyboard is mounted to the digital apparatus 10, it will normally be stationary relative to the NFC antenna 91 of the digital apparatus. Accordingly, the digital apparatus 10 will not register any change of impedance on its antenna 91, and therefore not starting up an NFC initialisation sequence transmitting longer polling pulses.

Figure 5B:
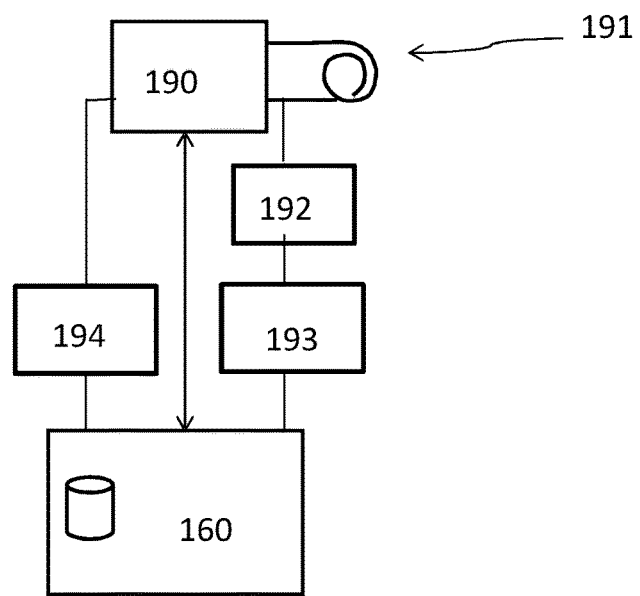
FIG. 5B is a schematic illustration of components parts of an embodiment of the wireless keyboard comprising an impedance modification network, an engage key and a regulator.

FIG. 5B presents a simplified view of a part of an embodiment of the keyboard means 110 comprising in addition to a wireless antenna 191, a wireless interface 190, and a data processor 160, also an engage key 192, an impedance modification network 193 and a regulator 194.

An initialization step of the present invention may comprise actively changing an impedance of the keyboard means 110 which may comprise connecting the wireless antenna 191 to the impedance modification network 193 by an engage key 192. By doing this in a way that emulates the digital apparatus 10 and the keyboard means 110 approaching each other. Connecting the wireless antenna 190 and the impedance modification network 192 will be registered as a change of impedance at the antenna 91 of the digital apparatus 10. This may provide for the digital apparatus 10 powering up for NFC communication, regardless of physically letting the digital apparatus 10 and the keyboard means 110 approaching each other, but staying close enough to enable NFC communication.

The engage key 192 is typically arranged for establishing a connection between the impedance modification network 193 and the wireless antenna 191. The impedance modification network 193 may comprise a capacitor arranged in series for connecting the wireless antenna 191 to a defined potential via the engage key 192. The defined potential may e.g. be earth. The impedance modification network 193 may also comprise components like one or more resistors or inductors.

The data processor 160 further comprises a power input arranged for receiving power harvested from the digital apparatus 10 for starting up and powering the data processor 160. Power from the digital apparatus 10 is received by the wireless antenna 191 and transmitted via the wireless interface 190 and a regulator 194 to power input of the data processor 160. The data processor 160 will power up when sufficient power is received at the power input.

The engage key 192 is further arranged for establishing connection between the wireless antenna 190 and a signal input of the data processor 160 where said input may be a power on/off signal input. The connection may be established via a rectification circuit, where the rectification circuit is arranged for sending a signal to the signal input of the data processor 160, and activating the keyboard means 110.

The data processor 160 is arranged for checking status of the power on/off signal input, and for responding to an initialization sequence received from the digital apparatus 10 over the wireless antenna 190 dependent on said status, said engage key 192 being arranged for making said signal input going high when activated as described above. Thereby the keyboard means 110 only responds to an NFC initialization sequence from the digital apparatus 10, meaning that it refrains from responding if the digital apparatus 10 emitting a request for new device message is caused by another device (tag) than the keyboard means 110.

As detailed above, activating the engage key 192 may provide both for the keyboard means 110 being detected by the digital apparatus 10, receiving messages with sufficient energy for powering up the data processor 160 and for the keyboard means 110 responding to an NFC initialization sequence, thus establishing NFC communication without conflicts with other NFC devices.

The approach outlined above can be utilized not only for initiating normal NFC communication. This could again be used for different uses like charging batteries or for powering different kinds of equipment or systems. Special purpose NFC communication can also be emulated for the same purpose.

FCWK Engage and Disengage Process

Figure 6:
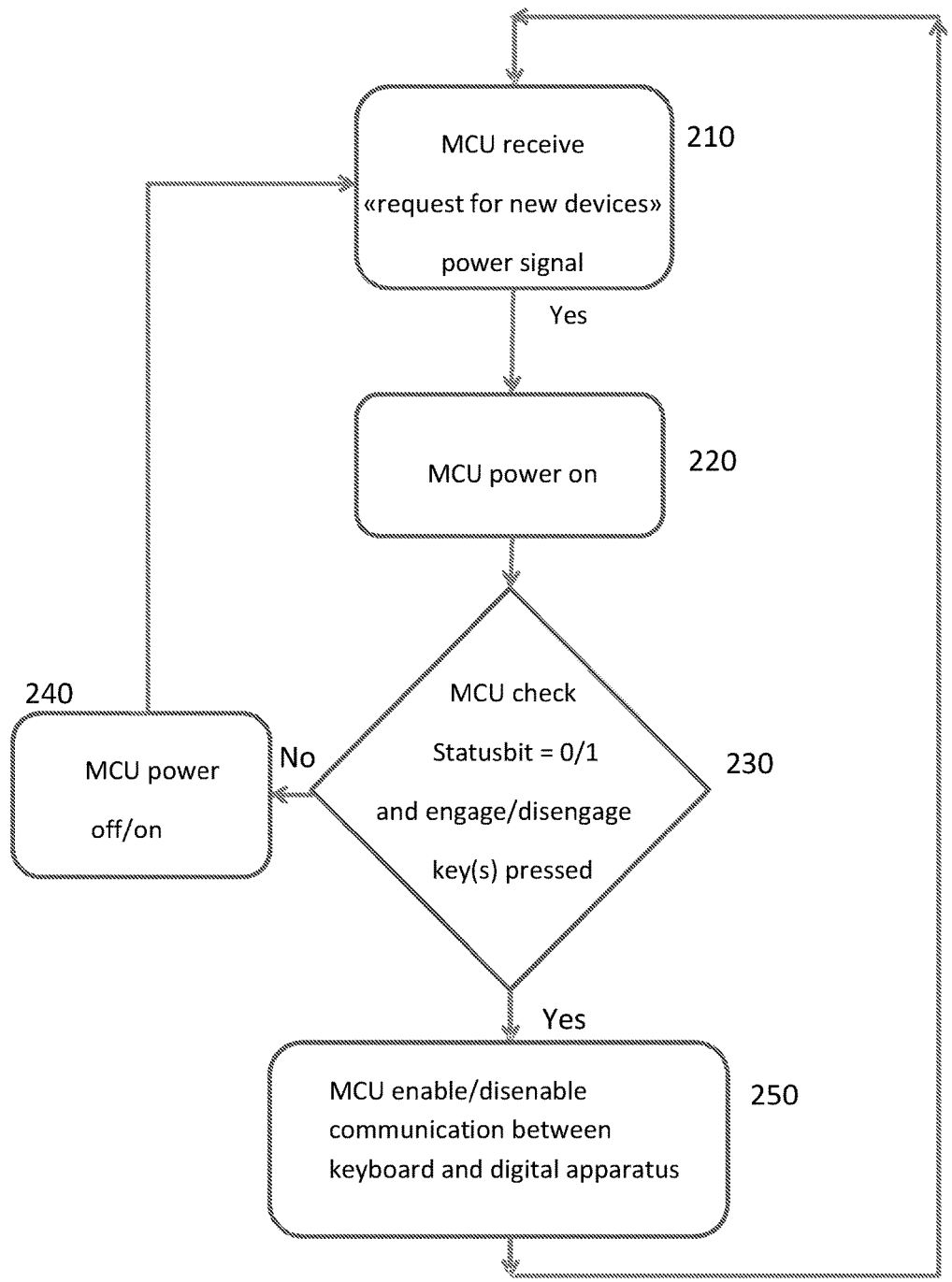
FIG. 6 is a flow diagram illustration of the flip cover wireless keyboard engage and disengage process.

The process in the data processor 160 is illustrated as a flow diagram in FIG. 6. In a preferred embodiment, the request message is used to engage and disengage the data processor 160. When receiving the request message 210, the data processor 160 is being activated, in other words powered on, if it has not already been activated at an earlier stage 220. In addition, the user input means 130 may also be powered on if it is a user input means 130 consuming power, such as a touch screen display.

Thereafter, the data processor 160 reads a predefined status bit in a memory area. If the status bit is set to zero, then the keyboard means 110 is in disengage state. Further, if the status bit is set to one, then the keyboard means 110 is in engage state and the data processor 160, the user input means 130 and wireless interface 190 are activate.

Next, the data processor 160 reads off the user input means 130 and checks if a dedicated key or combination of keys are being pressed 230. If the dedicated keys are not being pressed, the keyboard means 110 stays in the same state as either engaged or disengaged 240. If the dedicated keys are being pressed, then the keyboard means 110 will enter the opposite state 250. In other words, if the keyboard means 110 is in disengage state it will be engaged and if the keyboard means 110 is in engage state it will be disengaged.

When the keyboard means 110 enters the engage state it will continuously receive power from the digital apparatus 10 via the wireless interface 190. In addition, the data processor 160, the user input means 130 and the wireless interface 190 will be active until the keyboard enters the disengage state. When the keyboard means 110 enters the disengage state it will inactivate the data processor 160 and the user input means 130, and the wireless interface 190 will not be allowed to transmit data to any digital apparatus.

Moreover, when the keyboard means 110 is in disengage state, the dedicated keys are referred to as engage keys, and opposite, when the keyboard means 110 is in engage state the dedicated keys are referred to as disengage keys. The key(s) may be any form of user activated item such a widget, a software application key, a mechanical key or button or a touch screen key.

FCWK Electronics Implementation

More specifically, wherein the NFC protocol is being used to enable the keyboard means 110 to interface, communicate and harvest power from a digital apparatus 110, the keyboard means 110 may be implemented utilizing the following components:

The data processor 160 may incorporate a flash memory for handling NFC communication and is an off the shelf component.

The wireless interface 190 may incorporate a power harvest circuit that draws power from the NFC signal field to power auxiliary circuits. The power harvest circuit functions as a power and rectification circuit, and could be a custom made analog circuit. Furthermore, the wireless interface 190 may incorporate an off the shelf NFC or RFID circuit for communication.

The user input means 130 may include a standard keyboard chip and a mechanical keyboard or a touch screen, and these are easily available off the shelf components. The functionality could also be integrated into the data processor.

In this setup, the Dual Microcontroller 120 is an I2O master and the keyboard chip is an I2O slave. The Dual Microcontroller 120 (master) reads off key events, inserted by a user utilizing the keyboard means 110, from the keyboard chip (slave) and insert the content into an accompanying flash memory.

FCWK User Input

Figure 7:
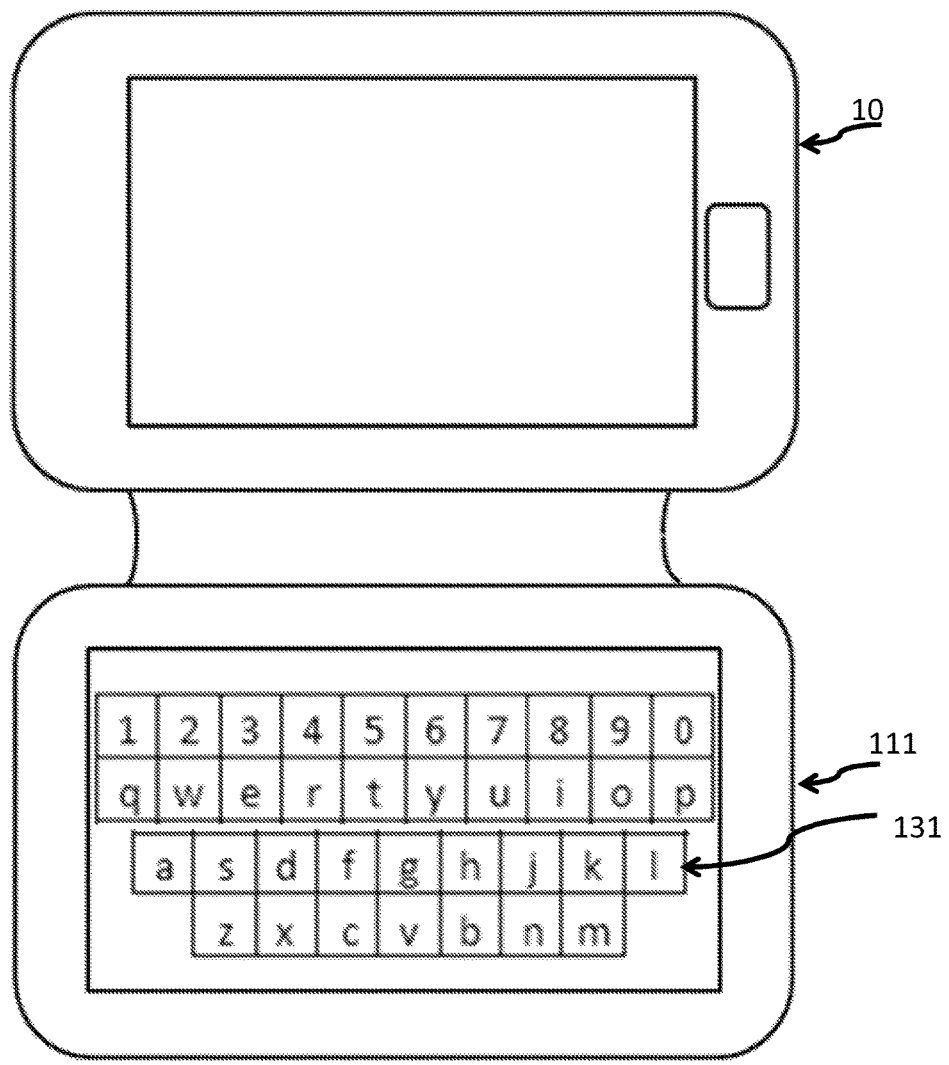
FIG. 7 is a schematic illustration of the flip cover wireless keyboard in an open position and wherein the keyboard is a mechanical keyboard.
Figure 8:
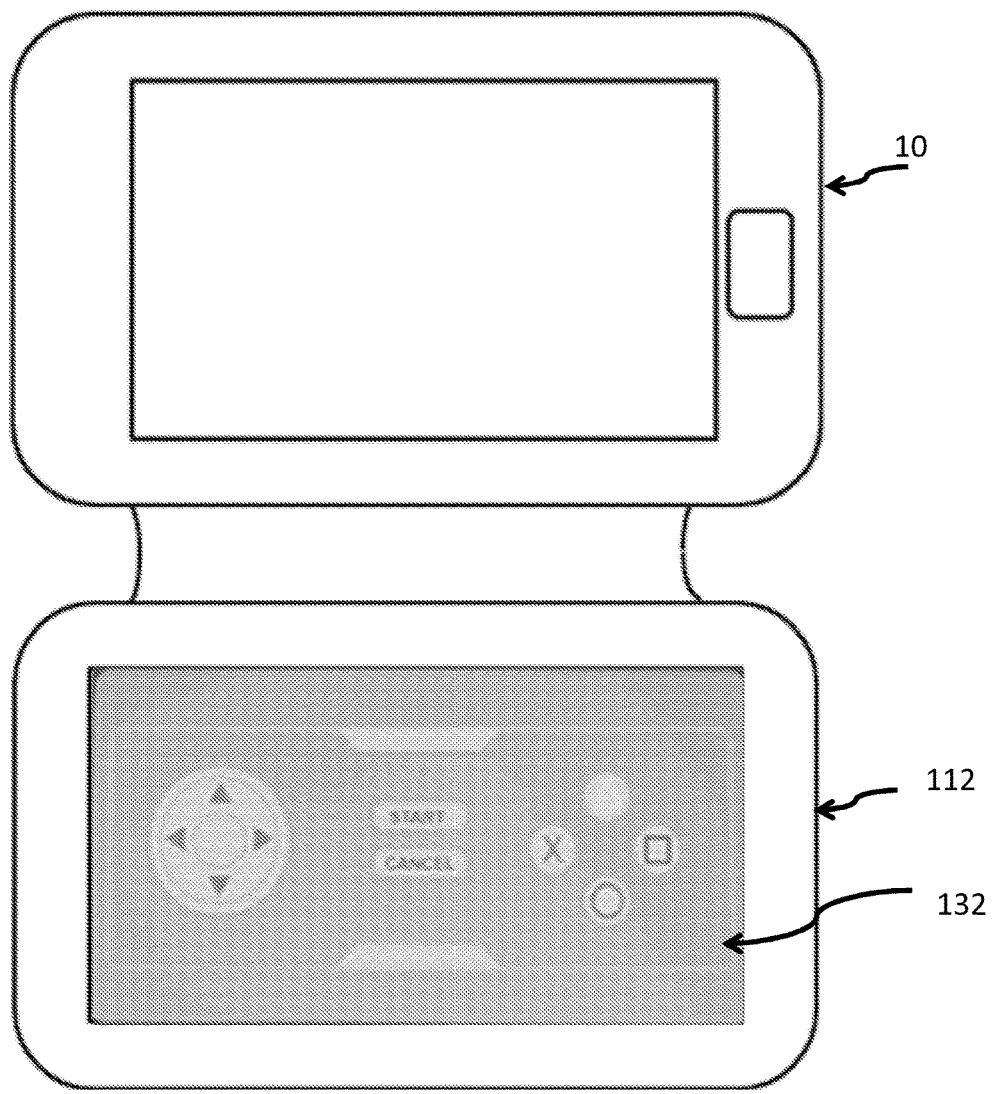
FIG. 8 is a schematic illustration of the flip cover wireless keyboard in an open position wherein the keyboard is a touch screen keyboard.

As mentioned earlier, the user input means 130 inside the keyboard means 110 may be implemented with a fixed mechanical interface or may be delivered with for example with a touch screen, e.g. a touch screen with a changeable (graphical) user interface. The two different embodiments are shown in FIGS. 7 and 8. FIG. 7 shows a schematic illustration of an attached FCWK 100B in an open position and wherein the user input means 131 in the keyboard unit 111 is a mechanical keyboard. Furthermore, FIG. 8 shows a schematic illustration of an attached FCWK 100B in an open position and wherein the user input means 132 in the keyboard unit 112 is a touch screen. In FIG. 8, the touch screen displays a gaming user interface, but by changing user interface software other user interface may be implemented such as various user interfaces adapted to different alphabets, keyboard types or alpha-numeric keys, user interfaces applicable for managing multimedia software applications and user interfaces applicable for reading e-books. Moreover, as can be seen in both FIGS. 7 and 8, the attached FCWK 100B encloses a digital apparatus 10.

FCWK Common Functionality

In a further embodiment, the FCWK 100 is optimized for integrating the keyboard to all kinds of digital apparatus in a seamless way. By integrating the FCWK 100A with a digital apparatus, electronically and/or mechanically, the combined device FCWK 100B will have additional functionality that increases the usability of the combined device FCWK 100B.

FCWK Electronic Integration

In the combined device FCWK 100B, electronically integration is implemented by downloading a software program from the data processor 160, in the keyboard means 110, to associated memory in the data processor 60, in the digital apparatus 10. An alternative solution is to download the software program from internet, for example as a mobile app from Apple App Store, Google Play or Windows Phone Store. When the software program has been installed in memory in the data processor 60, in the digital apparatus 10, the two units interoperate and share functionality.

Figure 9:
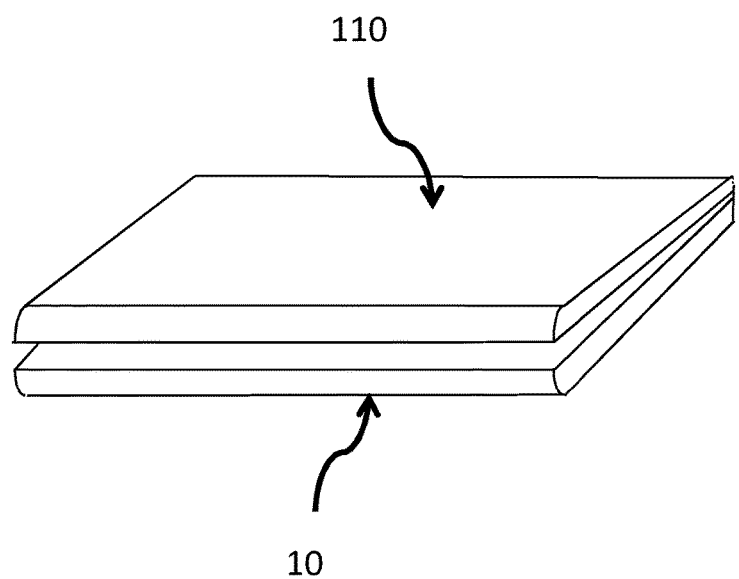
FIG. 9 is a schematic illustration of the flip cover wireless keyboard overlaying a digital apparatus in a closed position.

One example of common electronic functionality is the use of sensors. For example to increase the usability and the interoperability the functionality may utilize at least one sensor, for example a camera sensor in the digital apparatus 10, for enabling detection of position of the keyboard means 110 in relation to the digital apparatus 10. If the sensor detects that the keyboard means 110 is covering the screen of the digital apparatus 10, in other words the attached FCWK 100B is in closed position as shown in FIG. 9, then the functionality may disenable the keyboard means 110 and/or the digital apparatus 10. Or if a sensor detects that the keyboard means 110 is being flipped behind the back side of the digital apparatus 10, then the functionality may disenable the keyboard means 110. Additionally, if the functionality detects for example that a phone application is being activated at the digital apparatus 10 then the keyboard means 110 may be disenabled until when the phone application is being deactivated again.

Figure 1:
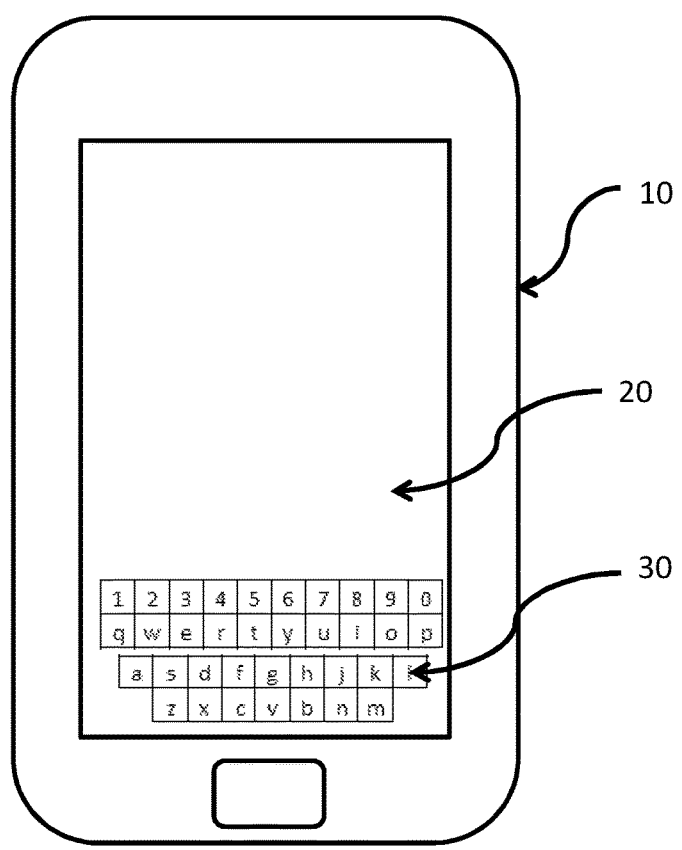
FIG. 1 is a schematic illustration of a known contemporary smartphone with keyboard application activated and visible at touch screen.
Figure 2:
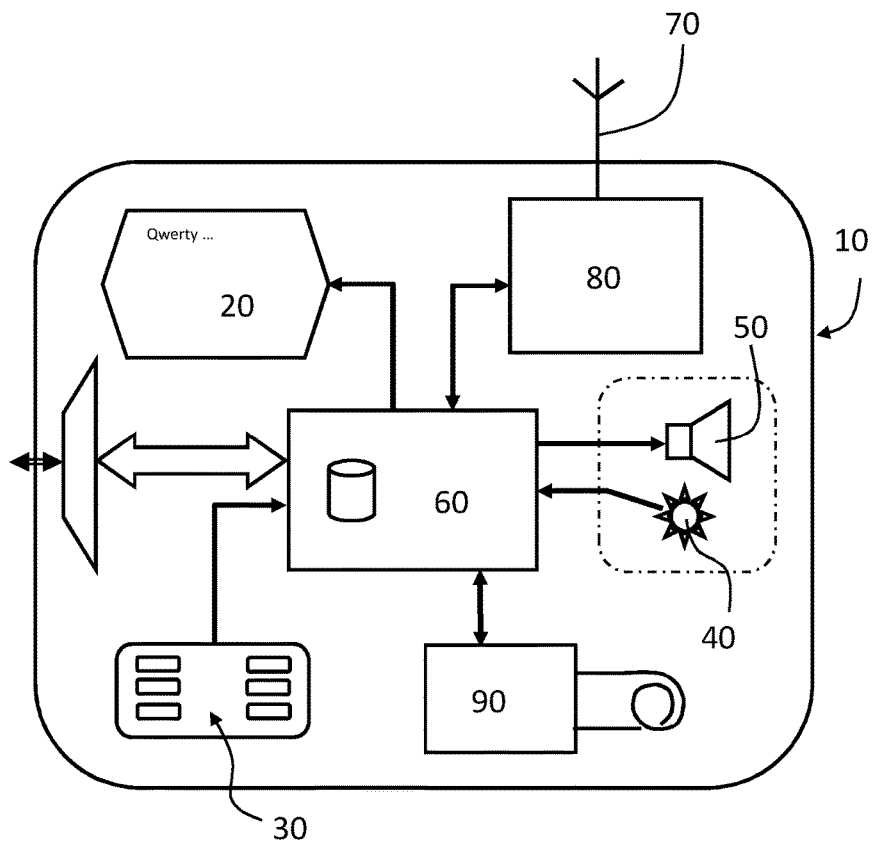
FIG. 2 is a schematic illustration of component parts comprising the smartphone of FIG. 1.

Another example of common electronic functionality is to use the downloaded software program to control the visual user interface and the data displayed at both the touch screen in the keyboard means 110 and the touch screen in the digital unit 10. For example, when the keyboard means 110 is connected to a digital apparatus 10 and the keyboard means 110 is being enabled, then the touch keyboard 30 in FIG. 1, for inputting data into the smartphone 10, is being disenabled and vice versa. In situations, wherein the touch keyboard is being disenable the complete screen of the digital apparatus 10 may be utilized for viewing data.

Furthermore, the downloaded software program makes it also possible to display multimedia software applications at both touch screens. For example an e-book reader application may display a page in a book at one touch screen and a consecutive page at the second touch screen, hence to mimic an open book showing.

FCWK Mechanical Integration

Utilizing the NFC protocol, the keyboard means 110 is enabled to interface and communicate with several different types of digital apparatus. However, for the FCWK to be capable of operating with the different types of digital apparatus, both electronically and mechanically, the FCWK is in addition equipped with a mechanical interface that is encapsulating the digital apparatus 10.

The mechanical interface may be tailor made for a special type of digital apparatus or said mechanical interface may have an adaptable construction mechanically attachable to several different types of miniature digital apparatus. In addition, the mechanical interface in a FCWK may also include protection means in the flip, in other words the digital apparatus substrate 102, for covering and safeguarding a digital apparatus 10.

FIG. 10 shows a schematic illustration of a FCWK 100A comprising a keyboard means 110 in near proximity to a digital apparatus 10. In this embodiment, the digital apparatus 10 is not encapsulated by said FCWK 100A. As such in this setup, the keyboard means 110 is able to interface and communicate with the digital apparatus 10, but the FCWK 100A is not fully operable with the digital apparatus 10, since these units are not combined into one mechanical unit. Consequently, they do not share common functionality.

Further, in another embodiment, FIG. 11 shows a schematic illustration of an attached FCWK 110B comprising a replaceable back cover 102B that encapsulates a digital apparatus 10. In this embodiment, the replaceable back cover 102B, in other words the flip, is tailor made to fit a special type of digital apparatus 10 and the flip may contain electronic components such as the wireless interface 190 and the data processor 160. The bendable substrate 103 allows the attached FCWK 100B to be flipped from open to closed position and vice versa.

In another embodiment, FIG. 12 shows a schematic illustration of an attached FCWK 100B comprising a mechanical flip 102B that sticks to a digital apparatus 10. The flip is adhesive at the side facing the digital apparatus 10 and the adhesiveness is achieved by utilizing either glue, materials with hook and loop fasteners, brackets or other fastening techniques. In this embodiment, the attached FCWK 100B is mechanically attachable to several different types of digital apparatus. Furthermore, the flip 102B may comprise a compact unit 104 comprising electronic components, such as the wireless interface 190 and the data processor 160.

Moreover, in yet another embodiment is shown in FIG. 13, FIG. 13 shows a schematic illustration of an attached FCWK 100B comprising a mechanical flip 102B that sticks to an external protection cover 102C attached to a digital apparatus 10. In this embodiment, the external protection cover 102C may be equipped with brackets, clamps or other fastening techniques, making the attached FCWK 100B mechanical attachable to several different types of digital apparatus. Furthermore, in this arrangement the attached FCWK 100B protects the backside of the digital apparatus 10 and at the same time is adaptable to fit to different types of digital apparatus.

FCWK Flip Electronics

Figure 14:
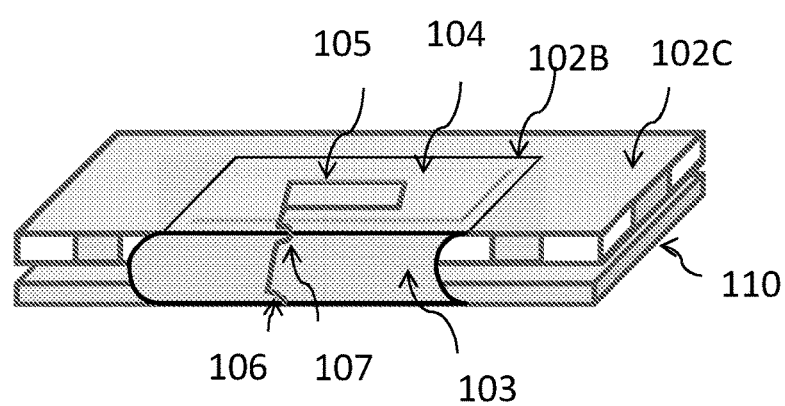
FIG. 14 is a schematic illustration of the flip cover wireless keyboard comprising an external back cover containing electronics that encapsulates a digital apparatus.

In a further embodiment, FIG. 14 shows a schematic illustration of an attached FCWK 100B comprising at least one integrated electronic circuit/component 105 in the flip that encapsulates a digital apparatus 10. The circuit 105 is connected to the keyboard means 110 through at least one electrical wire 106 integrated within the bendable substrate 103. The electrical wire 106 is extended with at least one additional length 106, of 1 mm to 4 mm, visualized as a half circle in FIG. 14, at the passages between the substrates 101 and 102 and the bendable substrate 103. The extensions are added in order for the electrical wire 106 to withstand multiple flipping of the attached FCWK 100B and to withstand wire displacements that occurs when the keyboard substrate 101 is bent all way to the back side or to the front side of the digital apparatus substrate 102.

Overall, since the FCWK 100 is wireless there is not need to make a physical electrical connection between the keyboard means 110 and the digital apparatus 10 rendering the FCWK 100 easier to couple promptly into communication with a digital apparatus, and also renders the FCWK 100, in other words the keyboard means 110, more reliable in operation.

Overall, some of the advantages of the FCWK 100 arrangement is that power is harvested when it is available, and that the power consumption is reduced to $\frac{1}{10}$ of the existing solutions. There is not a need for battery, power wirings circuitry and power wire charging in the keyboard means 110 making it possible to produce a slim product with reduced complexity compare to existing solutions. Reduced complexity together with the use off shelf components in the design makes the arrangement economical viable. Further, the FCWK 100 arrangement is mechanically versatile and may be attached to several different types of digital apparatus. It operates in both attached and unattached modus, and when attached, it protects and safeguards the digital apparatus. The FCWK 100 arrangement interfaces and communicates with several different types of digital apparatus. Additionally the FCWK may have exchangeable versatile user input means adaptable to different user scenarios. Moreover, the FCWK 100 arrangement is cooperating with the digital apparatus introducing common functions and as such making the product more user friendly.

While the present invention will be described with reference to the particular illustrative embodiments, it is not to be restricted by the embodiment but only by the appended claims. It is to be appreciated that those skilled in the art can change or modify the embodiments without departing from the scope and spirit of the present invention.

Expressions such as "comprise", "include", "contain", "incorporate", "is", "have" and similar are intended to be construed in a non-exclusive manner, namely allowing for other items or components which are not explicitly defined to be present. Reference to the singular shall also be construed to refer to the plural.

The invention claimed is:

1. A flip cover wireless keyboard for a digital apparatus comprising
   keyboard means for receiving user input data, processing data and for interfacing said digital apparatus,
   mechanical means for attaching to said digital apparatus, protection means for covering and safeguarding said digital apparatus, the keyboard means comprising user input means, data processor, wireless interface and wireless antenna, characterized in that said keyboard means utilizing a NFC protocol for setting up a connection with the digital apparatus, for harvesting power from the digital apparatus and for transmitting data to the digital apparatus in response to user-actuation, and said keyboard means receiving a request message from said digital apparatus used for powering and turning on the keyboard means, the data processor determining if at least one engage key being pressed at user input means, the data processor receiving data from user input means and processing and transmitting said data to the digital apparatus, wherein the keyboard means comprises means for modifying an impedance of the wireless antenna providing for being detected by the digital apparatus providing for receiving a request for devices message from the digital apparatus with sufficient power for start up of the data processor, wherein the means for modifying an impedance comprises an impedance modification network, and where the engage key is arranged for activating the impedance modification network, wherein the engage key is arranged for establishing a connection between the impedance modification network and the wireless antenna, wherein the impedance modification network comprises one or more of the following components: a capacitor, a resistor and an inductor, and where the impedance modification network is connected between the wireless antenna and a point at a defined potential by the engage key, and wherein the data processor has a power on/off signal input, and the engage key is arranged for establishing connection between the wireless antenna and the power on/off signal input via a rectification circuit, and where the rectification circuit is arranged for sending a signal to the power on/off signal input of the data processor, and the data processor comprises power input arranged for receiving power harvested from the digital apparatus for starting up and powering the data processor.

2. A flip cover wireless keyboard according to claim 1, where the data processor is arranged for checking that the engage key is activated by checking status of the power on/off signal input, and for responding to an initialization sequence received from the digital apparatus over the wireless antenna dependent on said status.

3. A flip cover wireless keyboard according to claim 1, where the keyboard means is arranged for receiving energy from the request message to start up and provide power to the data processor and a wireless interface arranged between the wireless antenna and the data processor.

4. A flip cover wireless keyboard according to claim 1, the keyboard means comprising a user input means, a data processor, and a wireless interface, and powering and turning on the data processor, the data processor determining if the keyboard means is in engage or disengage state, the data processor reading the input means determining if at least one engage key being pressed at the user input means, the keyboard means entering opposite state if the at least one engage key is being pressed, and i) when in engage state the keyboard means receiving power from the digital apparatus via the wireless interface, the data processor receiving and processing data from the user input means and the keyboard means transmitting said data to the digital apparatus, and ii) when in disengage state the keyboard means inactivating the data processor and the user input means, and not allowing the wireless interface to transmit data.

5. A keyboard according to claim 1, wherein the keyboard means receiving a request message powering the keyboard means, the keyboard means determining if at least one disengage key being pressed at user input means, the keyboard means being turned off disenabling communication with the digital apparatus.

6. A keyboard according claim 5 wherein said engage key or disengage key being a widget, a software application key, a mechanical key, a dedicated key or a combination of keys.

7. A keyboard according to claim 1, wherein said keyboard means utilizes the NFC protocol for interfacing directly with the digital apparatus without the need for manually pairing of said keyboard means and the digital apparatus.

8. A keyboard according to claim 1, wherein said keyboard means utilizes the NFC protocol for interfacing with a plurality of different types of digital apparatus.

9. A keyboard according to claim 1, wherein said keyboard means utilizes the NFC protocol for receiving power wirelessly without the need for battery, power wirings circuitry and power wire charging.

10. A keyboard according to claim 1, wherein received said request message is a NFC protocol request for new devices message.

11. A keyboard according to claim 1, wherein said user input means being either a mechanical keyboard or a touch screen keyboard.

12. A keyboard according to claim 11, wherein flip cover wireless keyboard is mechanical attachable to several different types of digital apparatus.

13. A keyboard according to claim 1, wherein the mechanical means comprises a mechanical flip that sticks to a digital apparatus, the flip being adhesive at the side facing the digital apparatus and the adhesiveness is achieved by utilizing either glue, materials with hook and loop fasteners, brackets or other fastening techniques.

14. A keyboard according to claim 1, wherein the protection means is fastened to a digital apparatus, for covering and safeguarding said digital apparatus, wherein said protection means may be equipped with flexible brackets, clamps or other fastening objects.

15. A keyboard according to claim 11, wherein said touch screen keyboard comprising various user interfaces adapted to different alphabets, keyboard types or alpha-numeric keys, user interfaces applicable for managing multimedia software applications and user interfaces applicable for reading e-books.

16. A method for operating a flip cover wireless keyboard comprising keyboard means for receiving user input data, processing data and for interfacing a digital apparatus, the keyboard means comprising user input means, data processor, wireless interface and wireless antenna, mechanical means for attaching to a digital apparatus, protection means for covering and safeguarding a digital apparatus, characterized in utilizing an NFC protocol at the keyboard means for setting up a connection with the digital apparatus, for harvesting power from the digital apparatus and for transmitting data to the digital apparatus in response to user-actuation, and receiving a request message for powering and turning on the keyboard means, determining if at least one engage key being pressed at user input means in the keyboard means, receiving data from user input means and processing and transmitting said data to the digital apparatus, receiving the request for device message by the wireless antenna, providing power to the data processor and a wireless interface based on the request for device message;

sending a signal based on the request for device message to the data processor for starting it up;

receiving the request for device message including an NFC initialisation sequence by the data processor over the wireless interface; and checking that a power on/off input of the data processor is high, and if it is high, responding to the received NFC initialization sequence.

17. A method according to claim 16, the method further comprising the following steps: —changing an impedance of the wireless antenna adapted to be detected by the digital apparatus providing for an alteration of the impedance of the antenna of the digital apparatus providing for the digital apparatus sending out a request for device message with an NFC initialisation sequence.

18. A method according to claim 16, where the changing of the impedance comprises establishing a connection between the wireless antenna an impedance modification network.

19. A method according to claim 18, where establishing a connection comprises activating an engage key comprised by the keyboard input means.

20. A method according to claim 16, wherein receiving a request message powering and turning on the keyboard means, determining if at least one disengage key being pressed at user input means, the keyboard means being turned off disenabling communication with the digital apparatus.

21. A method according to claim 20, wherein said engage key or disengage key being a widget, a software application key, a mechanical key, a dedicated key or a combination of keys.

22. A method according to claim 20, wherein utilizing the NFC protocol for interfacing directly with the digital apparatus without the need for manually pairing of said keyboard means and the digital apparatus.

23. A method according to claim 16, wherein utilizing the NFC protocol for interfacing with a plurality of different types of digital apparatus.

24. A method according to claim 16, wherein utilizing the NFC protocol for receiving power wirelessly without the need for battery, power wirings circuitry and power wire charging.

25. A method according to claim 16, wherein received said request message is a NFC protocol request for new devices message.

* * * * *

UNITED STATES PATENT AND TRADEMARK OFFICE
CERTIFICATE OF CORRECTION

PATENT NO. : 10,318,012 B2
APPLICATION NO. : 15/502366
DATED : June 11, 2019
INVENTOR(S) : Kyrre Tangen et al.

Page 1 of 1

It is certified that error appears in the above-identified patent and that said Letters Patent is hereby corrected as shown below:

On the Title Page

Page 2, Column 1, Line 1 (56) References Cited:
OTHER PUBLICATIONS
"E. Strommer et al., "NEC-enabled Wireless Charging", 2014 4th International Workshop on Near Field communication, IEEE, Mar. 13, 2012, pp. 36-41".
Should read:
-- E. Strommer et al., "NFC-enabled Wireless Charging", 2014 4th International Workshop on Near Field communication, IEEE, Mar. 13, 2012, pp. 36-41 --.

Signed and Sealed this
Twenty-ninth Day of October, 2019

Andrei Iancu
*Director of the United States Patent and Trademark Office*